United States Patent [19]

Laing

[11] 3,960,205
[45] June 1, 1976

[54] STORAGE BODY WITH LATENT STORAGE SUBSTANCES FOR TEMPERATUE EQUILIZATION

[76] Inventor: Nikolaus Laing, Hofener Weg 35 bis 37, 7141 Aldingen near Stuttgart, Germany

[22] Filed: Feb. 21, 1973

[21] Appl. No.: 334,445

[30] Foreign Application Priority Data

Feb. 24, 1972 Germany............................ 2208712

[52] U.S. Cl.................................. 165/48; 126/270; 126/400; 165/18; 165/104 R; 237/1 A
[51] Int. Cl.².......................................... F24J 3/02
[58] Field of Search .............. 126/270, 400; 165/18, 165/48, 104; 237/1 A

[56] References Cited
UNITED STATES PATENTS

| | | | |
|---|---|---|---|
| 2,595,905 | 5/1952 | Telkes | 237/1 A |
| 3,249,682 | 5/1966 | Laing | 174/35 |
| 3,375,321 | 3/1968 | Laing | 174/35 MS |
| 3,463,161 | 8/1969 | Andrassy | 126/400 |
| 3,720,198 | 3/1973 | Laing et al. | 126/400 |

*Primary Examiner*—Albert W. Davis, Jr.
*Assistant Examiner*—Sheldon Richter
*Attorney, Agent, or Firm*—Pennie & Edmonds

[57] ABSTRACT

In a device for reducing the temperature variation in buildings having optically transparent walls and means which permit control of the transmission, absorption and/or reflection of heat said walls possess spaces containing crystalline substances the melting temperature of which is nearer to the mean inside temperature than to the outside temperature.

9 Claims, 4 Drawing Figures

STORAGE BODY WITH LATENT STORAGE SUBSTANCES FOR TEMPERATUE EQUILIZATION

THE PRIOR ART

Buildings having pneumatically supported structures and optically transparent walls and devices by which the influx of solar radiation and/or the emission of long-wave radiation at night can be controlled are known. Examples of such structure are disclosed in my U.S. Pat. Nos. 3,249,682 and 3,375,221.

Buildings with variable heat transmission walls or roof structures make it possible to raise the heat internal temperature by a cyclic variation of the transmissibility of the wall. During the day, solar radiation is permitted to penetrate inside the building and, during the night, reflection of radiation replaces heat transmission so that the long-wave heat radiation from the ground beneath the building cannot penetrate but is reflected back towards the ground.

By a phase shift of the variable heat transmission walls of about 12 hours, a cooling down of the inside of the building takes place, increasing day by day, because the long-wave ground radiation emission into open sapce can take place whilst the solar radiation influx during the day is reflected by the walls.

In both cases, the thermal conductivity of the wall structure itself has a disturbing effect on the control of the building temperature because the inside temperature is determined, to some extent by the ground temperature beneath the building but is determined also by the wall temperature.

Thus, the outside layer of a building wall cools down during the night due to the lower exterior ambient temperature even though the long-wave ground heat radiation is reflected. The inward facing surfaces of the wall structure cool down during the night by conduction of heat through webs joining the exterior and interior surfaces of the wall such that the wall reflecting regions or the remaining surfaces then form a radiation sink in relation to the warm inside space with the result, at the end of the outgoing radiation phase, the inside temperature drops to an undesirable extent.

The thermal conductivity of the wall has an even more pronounced effect in buildings which are artificially cooled and the external skin of which is intensely heated by the sun during the day. The entire wall surface then becomes a long-wave thermal radiator and causes an undesirable flow of energy into the inside in the course of the day.

THE OBJECT OF THE INVENTION

The object of the invention is to prevent an undesirable rise of the temperature curve within a building during a 24-hour period.

DESCRIPTION OF THE INVENTION

According to the invention, latent heat energy storage devices are arranged between optically active elments in a wall structure. These storage devices comprise substances which crystallize at a specified temperature with the accompaniment of a release of the crystallisation enthalpy.

The choice of the storage substances is governed in the first place by the crystallisation temperature desired. In systems to be cooled, substances are used, the crystallisation temperature of which lies between about 10° C. and 30° C., whilst, in buildings to be heated, storage substances with a crystallisation temperature of 20° C. to 40° C. are preferred. According to the invention, the substances are preferably enveloped in foil hoses comprising a plastic material, for example a radiation stabilized polyolefin. These foil hoses are advantageously welded together at short intervals, e.g. 0.5 m, so that, in case of damage to the foil, only a limited quantity of the storage substance is lost. Another embodiment of the invention comprises including a thickening agent in the storage substances such that the substances no longer behave as liquid bodies. An example of thickening agents are alginates and starch. In this way, the formation of high hydrostatic pressure which would result in wall structures having long vertically extending foil hoses channel is avoided. In this case, the subdivision of the hoses into sections or chambers sealed from each other becomes unnecessary.

Metal salt hydrates or the eutectic mixture of such hydrates with other hydrates or with ion generating compounds are primarily suitable as storage substances. Examples of storage substances are sodium thiosulfate ($Na_2S_2O_3.5H_2O$) or sodium phosphate ($Na_3PO_4.12H_2O$) when the storage substances are to be used for heating purposes. Examples of storage substances when used for cooling purposes are sodium sulfate mixed with sodium chloride or calcium chloride and water. The quantity of substances to be used is within the range of 0.5 to 5 kilograms per square foot of the hose surface. Crystallising melts or solutions have a metastable range along their cooling curve. The phase change from the liquid into the solid phase takes place in this range. The heat release thus occurs at a lower temperature than the melting temperature at which the same substance has stored the latent energy.

The interval between the melting temperature and the crystallisation temperature can be reduced to any desired degree by the admixture of isotypical or epitaxial seed crystals. Examples of seed crystals are Borax or molybdenum dioxide where the storage substance is used for cooling purposes and calcium superphosphate or calcium mete-arsenate when the storage substance is used for heating purposes.

For buildings the inside temperature of which should lie above the outside temperature, the invention envisages storage substances to which no seed crystals have been added. By this means, the heat release takes place with a retardation and only after the ground and the internal structures have already cooled down to some extent. However to the contrary in buildings wherein the inside temperature is below the outside temperature, the most rapid possible heat emission is desired after opening by increasing the transmissibility of the wall structure so that the storage substances used there are preferably mixed with seeding crystals. The attachment to the wall of the hoses filled with storage substances forming the storage bodies is accomplished with the provision of an intermediate heat insulator, preferably another air-filled space. In this arrangement, the storage bodies to be heated are advantageously maintained optically black and the storage bodies for buildings to be heated should have an inward facing optically black layer.

By a suitable arrangement of reflecting regions in the wall structure, an undesirable heat emission by radiation should be prevented.

The invention will be described with the help of Figures or examples. It is, however, not confined to these examples.

Figures 1A, 1B:
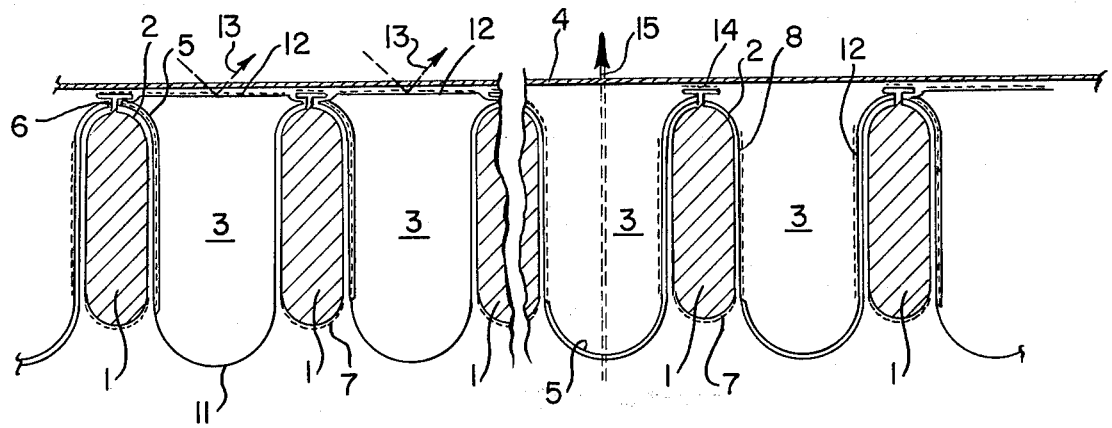
FIG. 1a shows diagrammatically a cross-section through a first device according to the invention during daytime operation.
FIG. 1b shows diagrammatically the device of FIG. 1a during nighttime operation.
Figures 2A, 2B:
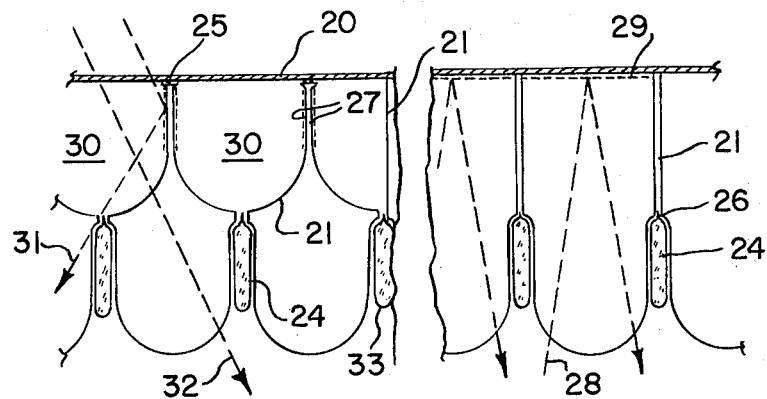
FIG. 2a shows diagrammatically a cross-section through a second device according to the invention during daytime operation; and, FIG. 2b shows diagrammatically the device of FIG. 2a during nighttime operation.

FIG. 1 shows diagrammatically a cross-section through a variable heat transmission wall with spaces 1 which are formed by foil hoses 2 and which are filled with storage substances. Hollow spaces 3 are situated between adjacent hollow spaces 1. These hollow spaces 3 are surrounded by air-filled foil webs 11. A flap foil 5 is situated in each hollow space 3. This flap foil has a reflecting region 12 shown by a broken line. A bottleneck 6 is provided in order to insulate the storage substance 1, situated within the foil hoses 2, against the outside wall 4. The foil web 11 is also reflecting along the broken line 8. The inward facing wall region of the foil hose 2 has a surface 7 which possesses a high emission in the range of wave lengths associated with a temperature of about 300°K. During the day, the foil 5 is held in the position shown in FIG. 1a so that the sun light penetrating from the outside is reflected by region 12 according to the arrow 13. The outward facing region 14 of the foil hose 11 is also reflecting. During the night, long-wave radiation according to the arrow 15 penetrates through the wall as shown in FIG. 1b, whereby the inside of the building is cooled down. Simultaneously, the storage substance 1 is cooled down and transforms into the crystalline state. During the day, the reflecting region 12 prevents not only the entry of sunlight 13 into the inside of the building but also keeps the sunlight away from the storage substance contained in the spaces 1. The air in the channels 3 is cooled owing to the relatively low temperature. In addition, thermal radiation from the inside of the building is absorbed via the surface 7 so that the inside temperature, in spite of the heating up of the foil regions 12, does not suffer any significant increase. FIG. 2a shows a foil wall design which is used preferably for buildings, the inside temperature of which in operation is higher than the outside temperature. The foil hoses 21 are connected to the outside wall by means of the seams 25. Foil hoses 24 containing a storage substance are connected via the seams 26 to the walls of adjacent foil hoses 21. The regions 27, shown by broken lines, have a surface which reflects long-wave radiation so that the radiation coming from the ground is thrown back along the arrow 28 as shown in FIG. 2b. In the morning, compressed air is forced into the gusset regions 29 so that channels 30 are formed as shown in FIG. 2a. After this, sunlight can penetrate into the inside of the building along the arrows 31 and 32. Simultaneously, the storage substance in the containers 24 is charged. During the following night, the storage substance again discharges its energy via the wall regions 33, facing the inside of the building, which radiate in the long-wave range in the form of a long-wave radiation and thereby reduces the temperature drop during the night.

I claim:

1. Wall structure for reducing temperature change within a building where said structure has optical transparent regions and control devices for controlling transmission of heat waves through the optical transparent regions, the improvement comprising having in addition foil hoses forming chambers which are sealed from each other at short intervals and a crystalline heat storage substance in said chambers having a melting temperature which is closer to the mean inside temperature to be maintained within a building than the mean ambient temperature outside the building.

2. Wall structure according to claim 1 wherein said chambers are positioned between the optically transparent regions.

3. Wall structure according to claim 1 wherein said chambers are insulated and separated from said wall structure by heat insulating regions.

4. Wall structure according to claim 1 adapted for use within a building where the inside temperature lies above the exterior mean ambient air temperature, the improvement further comprising in that the chamber facing the interior of a building has a high radiation heat emission surface for radiating heat waves associated with the temperatures of 300°K.

5. Wall structure according to claim 1 wherein said control devices include moveable reflective surfaces adapted to be moved to a horizontal position to face the interior of a building whereby heat radiated from the interior of the building will be reflected back to the interior.

6. Wall structure acording to claim 1 having in addition a thickner agent associated with the crystalline substance to provide a gel when the substance melts.

7. Wall structure according to claim 1 having in addition seed crystals having melting points higher than the melting temperature of said crystalline substance to assist said substance when melted to crystallize at a predetermined temperature.

8. Wall structure according to claim 1 adapted for use in a building where the inside temperature is below the exterior mean ambient temperature, the improvement further comprising in that said crystalline substance has a melting temperature which lies between 10°C. and 30°C.

9. Wall structure according to claim 1 adapted for use in a building where the inside temperature is above the exterior mean ambient temperature, the improvement further characterized in that the crystalline substance has a melting temperature which lies between 20°C. and 40°C.

* * * * *

UNITED STATES PATENT AND TRADEMARK OFFICE
CERTIFICATE OF CORRECTION

PATENT NO. : 3,960,205
DATED : June 1, 1976
INVENTOR(S) : NIKOLAUS LAING

It is certified that error appears in the above-identified patent and that said Letters Patent are hereby corrected as shown below:

```
Col. 1, line 11, "3,375,221" should be --3,375,321--
Col. 1, line 13, delete "heat" before "internal"
Col. 1, line 14, insert --heat-- before "transmissibility"
Col. 1, line 25  "sapce" should be --space--
Col. 2, line 15, delete "channel"
Col. 2, line 22  "(Na_3-" should be --(Na_3--
```

Signed and Sealed this

Seventeenth Day of August 1976

[SEAL]

Attest:

RUTH C. MASON
*Attesting Officer*

C. MARSHALL DANN
*Commissioner of Patents and Trademarks*